(12) United States Patent
Fabrykowski et al.

(10) Patent No.: US 8,792,767 B2
(45) Date of Patent: Jul. 29, 2014

(54) DISTRIBUTION DEVICE

(75) Inventors: Grzegorz Fabrykowski, Strykow (PL); Michael Mueller, Menden (DE)

(73) Assignee: CCS Technology, Inc., Wilmington, DE (US)

(*) Notice: Subject to any disclaimer, the term of this patent is extended or adjusted under 35 U.S.C. 154(b) by 403 days.

(21) Appl. No.: 13/087,765

(22) Filed: Apr. 15, 2011

(65) Prior Publication Data

US 2011/0305425 A1   Dec. 15, 2011

Related U.S. Application Data

(60) Provisional application No. 61/407,686, filed on Oct. 28, 2010, provisional application No. 61/325,082, filed on Apr. 16, 2010.

(51) Int. Cl.
*G02B 6/00* (2006.01)

(52) U.S. Cl.
USPC .......................................................... 385/135

(58) Field of Classification Search
None
See application file for complete search history.

(56) References Cited

U.S. PATENT DOCUMENTS

| | | | |
|---|---|---|---|
| 1,280,393 A | 10/1918 | Cannon | |
| 1,703,255 A | 2/1929 | Wagner | |
| 2,003,147 A | 5/1935 | Holm-Hansen | |
| 2,044,073 A | 6/1936 | Hurley | |
| 2,131,408 A | 9/1938 | Murrer | |
| 2,428,149 A | 9/1947 | Falk | |
| 2,681,201 A | 6/1954 | Grunwald | |
| 2,984,488 A | 5/1961 | Kirchner | |
| 3,054,994 A | 9/1962 | Haram | |
| 3,204,867 A | 9/1965 | Wahlbom | |
| 3,435,124 A | 3/1969 | Channell | |
| 3,880,390 A | 4/1975 | Niven | |
| 4,006,540 A | 2/1977 | Lemelson | |
| 4,012,010 A | 3/1977 | Friedman | |
| 4,073,560 A | 2/1978 | Anhalt et al. | |
| 4,123,012 A | 10/1978 | Hough | |
| 4,177,961 A | 12/1979 | Gruenewald | |
| 4,210,380 A | 7/1980 | Brzostek | |
| D257,613 S | 12/1980 | Gruenewald | |
| 4,244,544 A | 1/1981 | Kornat | |
| 4,261,529 A | 4/1981 | Sandberg et al. | |

(Continued)

FOREIGN PATENT DOCUMENTS

DE   4130706 A1   3/1993
DE   4133375 C1   4/1993

(Continued)

OTHER PUBLICATIONS

Final Office Action for U.S. Appl. No. 10/804,958 mailed Mar. 11, 2014, 13 pages.

(Continued)

*Primary Examiner* — Hemang Sanghavi (57) ABSTRACT

A distribution device which has a cover-like housing upper part and a housing lower part is disclosed. The housing lower part has a holding means for the cover-like housing upper part, with the result that the housing upper part can be held by the holding means of the housing lower part as the housing upper part is removed from the housing lower part. The housing upper part does not fall and be subject to damage when the housing upper part is removed or released from the housing lower part.

9 Claims, 3 Drawing Sheets

(56) References Cited

U.S. PATENT DOCUMENTS

| | | |
|---|---|---|
| 4,261,644 A | 4/1981 | Giannaris |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,579,310 A | 4/1986 | Wells et al. |
| 4,586,675 A | 5/1986 | Brown |
| 4,595,255 A | 6/1986 | Bhatt et al. |
| 4,611,887 A | 9/1986 | Glover et al. |
| 4,697,873 A | 10/1987 | Bouvard et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,007,701 A | 4/1991 | Roberts |
| 5,023,646 A | 6/1991 | Ishida et al. |
| 5,048,916 A | 9/1991 | Caron |
| 5,048,926 A | 9/1991 | Tanimoto |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,121,458 A | 6/1992 | Nilsson et al. |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | Machall et al. |
| 5,209,441 A | 5/1993 | Satoh |
| 5,210,374 A | 5/1993 | Channell |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,261,020 A | 11/1993 | de Jong et al. |
| 5,265,187 A | 11/1993 | Morin et al. |
| 5,271,585 A | 12/1993 | Zetena, Jr. |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,473,115 A | 12/1995 | Brownlie et al. |
| 5,479,553 A | 12/1995 | Daems et al. |
| 5,479,554 A | 12/1995 | Roberts |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,590,234 A | 12/1996 | Pulido |
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,751,882 A | 5/1998 | Daems et al. |
| 5,758,004 A | 5/1998 | Alarcon et al. |
| 5,764,843 A | 6/1998 | Macken et al. |
| 5,774,612 A | 6/1998 | Belenkiy et al. |
| 5,775,648 A | 7/1998 | Metzger |
| 5,778,132 A | 7/1998 | Csipkes et al. |
| 5,781,678 A | 7/1998 | Sano et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,870,519 A | 2/1999 | Jenkins et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |

(56) References Cited

U.S. PATENT DOCUMENTS

| | | |
|---|---|---|
| D427,897 S | 7/2000 | Johnston et al. |
| 6,118,075 A | 9/2000 | Baker et al. .................. 174/72 A |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | BuAbbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,710,366 B1 | 3/2004 | Lee et al. |
| 6,711,339 B2 | 3/2004 | Puetz et al. |
| 6,715,619 B2 | 4/2004 | Kim et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,804,447 B2 | 10/2004 | Smith et al. |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,934,451 B2 | 8/2005 | Cooke et al. |
| 6,937,807 B2 | 8/2005 | Franklin et al. |
| 6,946,605 B2 | 9/2005 | Levesque et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,006,748 B2 | 2/2006 | Dagley et al. |
| 7,027,695 B2 | 4/2006 | Cooke et al. |
| 7,054,513 B2 | 5/2006 | Herz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |

(56) References Cited

U.S. PATENT DOCUMENTS

| | | | |
|---|---|---|---|
| 7,130,519 B2 * | 10/2006 | Grubish et al. | 385/135 |
| 7,142,763 B2 | 11/2006 | Frohlich et al. | |
| 7,155,106 B2 | 12/2006 | Cianciotto et al. | |
| 7,171,121 B1 | 1/2007 | Skarica et al. | |
| 7,181,142 B1 | 2/2007 | Xu et al. | |
| 7,200,316 B2 | 4/2007 | Giraud et al. | |
| 7,200,317 B2 | 4/2007 | Reagan et al. | |
| 7,201,595 B1 | 4/2007 | Morello | 439/271 |
| 7,215,865 B2 | 5/2007 | Bellekens et al. | |
| 7,218,828 B2 | 5/2007 | Feustel et al. | |
| 7,245,811 B2 | 7/2007 | Takeda et al. | |
| 7,260,302 B2 | 8/2007 | Caveney | |
| 7,264,402 B2 | 9/2007 | Theuerkorn et al. | |
| 7,266,283 B2 | 9/2007 | Kline et al. | |
| 7,272,291 B2 | 9/2007 | Bayazit et al. | |
| 7,274,852 B1 | 9/2007 | Smrha et al. | |
| 7,280,733 B2 | 10/2007 | Larson et al. | |
| 7,289,731 B2 | 10/2007 | Thinguldstad | |
| 7,298,951 B2 | 11/2007 | Smrha et al. | |
| 7,302,153 B2 | 11/2007 | Thom | |
| 7,310,471 B2 | 12/2007 | Bayazit et al. | |
| 7,330,629 B2 | 2/2008 | Cooke et al. | |
| 7,331,722 B2 | 2/2008 | Tan | |
| 7,349,616 B1 | 3/2008 | Castonguay et al. | |
| 7,376,325 B1 * | 5/2008 | Cloud et al. | 385/135 |
| 7,379,650 B2 | 5/2008 | Weinert et al. | |
| 7,406,241 B1 | 7/2008 | Opaluch et al. | |
| 7,412,145 B2 | 8/2008 | Honma et al. | |
| 7,418,184 B1 | 8/2008 | Gonzales et al. | |
| 7,421,182 B2 | 9/2008 | Bayazit et al. | |
| 7,450,806 B2 | 11/2008 | Bookbinder et al. | |
| 7,460,757 B2 | 12/2008 | Hoehne et al. | |
| 7,471,867 B2 | 12/2008 | Vogel et al. | |
| 7,477,826 B2 | 1/2009 | Mullaney et al. | |
| 7,509,016 B2 | 3/2009 | Smith et al. | |
| 7,522,805 B2 | 4/2009 | Smith et al. | |
| 7,526,174 B2 | 4/2009 | Leon et al. | |
| 7,609,967 B2 | 10/2009 | Hochbaum et al. | |
| 7,613,376 B2 | 11/2009 | Wright et al. | |
| 7,636,507 B2 | 12/2009 | Lu et al. | |
| 7,766,732 B2 | 8/2010 | Hauville | |
| 7,769,265 B2 | 8/2010 | Cairns | |
| 7,970,249 B2 | 6/2011 | Solheid et al. | |
| 7,974,509 B2 | 7/2011 | Smith et al. | |
| 8,086,085 B2 | 12/2011 | Lu et al. | |
| 8,265,447 B2 | 9/2012 | Loeffelholz et al. | |
| 8,351,754 B2 | 1/2013 | Bell | |
| 8,437,595 B2 * | 5/2013 | Womack et al. | 385/135 |
| 2001/0001270 A1 | 5/2001 | Williams Vigliaturo | |
| 2002/0034290 A1 | 3/2002 | Pershan | |
| 2002/0037136 A1 | 3/2002 | Wang et al. | |
| 2002/0051616 A1 | 5/2002 | Battey et al. | |
| 2002/0118929 A1 | 8/2002 | Brun et al. | |
| 2002/0148846 A1 | 10/2002 | Luburic | |
| 2002/0150372 A1 | 10/2002 | Schray | |
| 2002/0180163 A1 | 12/2002 | Muller et al. | 277/602 |
| 2002/0181896 A1 | 12/2002 | McClellan et al. | |
| 2002/0181905 A1 | 12/2002 | Yoshida et al. | |
| 2003/0031419 A1 | 2/2003 | Simmons et al. | |
| 2003/0063866 A1 | 4/2003 | Melton et al. | |
| 2003/0063875 A1 | 4/2003 | Bickham et al. | |
| 2003/0095774 A1 | 5/2003 | Bohme et al. | |
| 2003/0103750 A1 | 6/2003 | Laporte et al. | |
| 2003/0132685 A1 | 7/2003 | Sucharczuk et al. | |
| 2003/0134541 A1 | 7/2003 | Johnsen et al. | |
| 2003/0142946 A1 | 7/2003 | Saito et al. | |
| 2003/0147597 A1 | 8/2003 | Duran | |
| 2003/0174996 A1 | 9/2003 | Henschel et al. | |
| 2003/0185535 A1 | 10/2003 | Tinucci et al. | |
| 2003/0194187 A1 | 10/2003 | Simmons et al. | |
| 2003/0223725 A1 | 12/2003 | Laporte et al. | |
| 2004/0001686 A1 | 1/2004 | Smith et al. | |
| 2004/0013390 A1 | 1/2004 | Kim et al. | |
| 2004/0042710 A1 | 3/2004 | Margalit et al. | |
| 2004/0074852 A1 | 4/2004 | Knudsen et al. | |
| 2004/0081404 A1 | 4/2004 | Elliott | |
| 2004/0084465 A1 | 5/2004 | Luburic | |
| 2004/0109660 A1 | 6/2004 | Liberty | |
| 2004/0123998 A1 | 7/2004 | Berglund et al. | |
| 2004/0146266 A1 | 7/2004 | Solheid et al. | |
| 2004/0150267 A1 | 8/2004 | Ferguson | |
| 2004/0175090 A1 | 9/2004 | Vastmans et al. | |
| 2004/0218970 A1 | 11/2004 | Caveney et al. | |
| 2004/0228598 A1 | 11/2004 | Allen et al. | |
| 2004/0240825 A1 | 12/2004 | Daoud et al. | |
| 2004/0264873 A1 | 12/2004 | Smith et al. | |
| 2005/0002633 A1 | 1/2005 | Solheid et al. | |
| 2005/0036749 A1 | 2/2005 | Vogel et al. | |
| 2005/0100301 A1 | 5/2005 | Solheid et al. | |
| 2005/0123261 A1 | 6/2005 | Bellekens et al. | |
| 2005/0129379 A1 | 6/2005 | Reagan et al. | |
| 2005/0152306 A1 | 7/2005 | Bonnassieux et al. | |
| 2005/0213921 A1 | 9/2005 | Mertesdorf et al. | |
| 2005/0232565 A1 | 10/2005 | Heggestad et al. | |
| 2005/0238290 A1 | 10/2005 | Choudhury et al. | |
| 2005/0265683 A1 | 12/2005 | Cianciotto et al. | |
| 2005/0276562 A1 | 12/2005 | Battey et al. | |
| 2005/0281526 A1 | 12/2005 | Vongseng et al. | |
| 2006/0029334 A1 | 2/2006 | Quinby et al. | |
| 2006/0049941 A1 | 3/2006 | Hunter et al. | |
| 2006/0072892 A1 | 4/2006 | Serrander et al. | |
| 2006/0083461 A1 | 4/2006 | Takahashi et al. | |
| 2006/0083468 A1 | 4/2006 | Kahle et al. | |
| 2006/0093278 A1 | 5/2006 | Elkins, II et al. | |
| 2006/0093301 A1 | 5/2006 | Zimmel et al. | |
| 2006/0093303 A1 | 5/2006 | Reagan et al. | |
| 2006/0098931 A1 | 5/2006 | Sibley et al. | |
| 2006/0133753 A1 | 6/2006 | Nelson et al. | |
| 2006/0153516 A1 | 7/2006 | Napiorkowski et al. | |
| 2006/0153517 A1 | 7/2006 | Reagan et al. | |
| 2006/0165364 A1 | 7/2006 | Frohlich et al. | |
| 2006/0182407 A1 | 8/2006 | Caveney | |
| 2006/0193590 A1 | 8/2006 | Puetz et al. | |
| 2006/0210229 A1 | 9/2006 | Scadden | |
| 2006/0210230 A1 | 9/2006 | Kline et al. | |
| 2006/0215980 A1 | 9/2006 | Bayazit et al. | |
| 2006/0251373 A1 | 11/2006 | Hodge et al. | |
| 2006/0263029 A1 | 11/2006 | Mudd et al. | |
| 2006/0269205 A1 | 11/2006 | Zimmel | |
| 2006/0269206 A1 | 11/2006 | Zimmel | |
| 2006/0269208 A1 | 11/2006 | Allen et al. | |
| 2006/0275007 A1 | 12/2006 | Livingston et al. | |
| 2006/0275008 A1 | 12/2006 | Xin | |
| 2006/0279423 A1 | 12/2006 | Nazari | |
| 2006/0285807 A1 | 12/2006 | Lu et al. | |
| 2007/0003204 A1 | 1/2007 | Makrides-Saravanos et al. | |
| 2007/0003205 A1 | 1/2007 | Saravanos et al. | |
| 2007/0023464 A1 | 2/2007 | Barkdoll et al. | |
| 2007/0031099 A1 | 2/2007 | Herzog et al. | |
| 2007/0031101 A1 | 2/2007 | Kline et al. | |
| 2007/0047891 A1 | 3/2007 | Bayazit et al. | |
| 2007/0047893 A1 | 3/2007 | Kramer et al. | |
| 2007/0047894 A1 | 3/2007 | Holmberg et al. | |
| 2007/0052531 A1 | 3/2007 | Mathews et al. | |
| 2007/0104447 A1 | 5/2007 | Allen | |
| 2007/0114339 A1 | 5/2007 | Winchester | |
| 2007/0263962 A1 | 11/2007 | Kohda | |
| 2007/0274718 A1 | 11/2007 | Bridges et al. | |
| 2008/0063350 A1 | 3/2008 | Trebesch et al. | |
| 2008/0085094 A1 | 4/2008 | Krampotich | |
| 2008/0131067 A1 | 6/2008 | Ugolini et al. | |
| 2008/0138026 A1 | 6/2008 | Yow et al. | |
| 2008/0145008 A1 | 6/2008 | Lewallen et al. | |
| 2008/0193091 A1 | 8/2008 | Herbst | |
| 2008/0253723 A1 | 10/2008 | Stokes et al. | |
| 2008/0259928 A1 | 10/2008 | Chen et al. | |
| 2008/0292261 A1 | 11/2008 | Kowalczyk et al. | |
| 2009/0034929 A1 | 2/2009 | Reinhardt et al. | |
| 2009/0060440 A1 | 3/2009 | Wright et al. | |
| 2009/0097813 A1 | 4/2009 | Hill | |
| 2009/0103865 A1 | 4/2009 | Del Rosso | |
| 2009/0103878 A1 | 4/2009 | Zimmel | |
| 2009/0208210 A1 | 8/2009 | Trojer et al. | |
| 2009/0245746 A1 | 10/2009 | Krampotich et al. | |

(56) References Cited

U.S. PATENT DOCUMENTS

| | | | |
|---|---|---|---|
| 2009/0252462 A1 | 10/2009 | Bonical | |
| 2009/0263122 A1 | 10/2009 | Helkey et al. | |
| 2009/0297111 A1 | 12/2009 | Reagan et al. | |
| 2009/0304342 A1* | 12/2009 | Adomeit et al. | 385/135 |
| 2009/0324189 A1 | 12/2009 | Hill et al. | 385/135 |
| 2010/0183274 A1 | 7/2010 | Brunet et al. | |
| 2010/0290753 A1 | 11/2010 | Tang et al. | |
| 2011/0097052 A1* | 4/2011 | Solheid et al. | 385/135 |
| 2011/0158599 A1 | 6/2011 | Kowalczyk et al. | |
| 2012/0104145 A1 | 5/2012 | Dagley et al. | |
| 2012/0301096 A1 | 11/2012 | Badar et al. | |
| 2012/0308190 A1 | 12/2012 | Smith et al. | |
| 2013/0034333 A1* | 2/2013 | Holmberg et al. | 385/135 |

FOREIGN PATENT DOCUMENTS

| | | | |
|---|---|---|---|
| DE | 4240727 C1 | 2/1994 | H05K 5/02 |
| DE | 29800194 U1 | 3/1998 | |
| DE | 10005294 A1 | 8/2001 | |
| DE | 10238189 A1 | 2/2004 | |
| DE | 202004011493 U1 | 9/2004 | |
| DE | 20320702 U1 | 11/2005 | H02G 3/08 |
| DE | 202005018884 U1 | 3/2006 | H02G 3/16 |
| DE | 202007012420 U1 | 10/2007 | |
| EP | 0409390 A2 | 1/1991 | |
| EP | 0410622 A2 | 1/1991 | |
| EP | 0415647 A2 | 3/1991 | |
| EP | 0490644 A1 | 6/1992 | |
| EP | 0541820 A1 | 5/1993 | |
| EP | 0593927 A1 | 4/1994 | |
| EP | 0720322 A2 | 7/1996 | |
| EP | 0725468 A1 | 8/1996 | |
| EP | 0828356 A2 | 3/1998 | |
| EP | 0840153 A2 | 5/1998 | |
| EP | 0928053 A2 | 7/1999 | |
| EP | 1107031 A1 | 6/2001 | |
| EP | 1120674 A1 | 8/2001 | |
| EP | 1179745 A2 | 2/2002 | |
| EP | 1203974 A2 | 5/2002 | |
| EP | 1316829 A2 | 6/2003 | |
| EP | 1944635 A2 | 7/2008 | |
| EP | 1944886 A1 | 7/2008 | |
| EP | 2141527 A2 | 1/2010 | |
| FR | 2123728 A5 | 9/1972 | H05K 5/00 |
| FR | 2748576 A1 | 11/1997 | |
| GB | 2254163 A | 9/1992 | |
| JP | 59107317 A | 6/1984 | |
| JP | 6227312 A | 8/1994 | |
| JP | 11125722 A | 5/1999 | |
| JP | 11231163 A | 8/1999 | |
| JP | 2001116968 A | 4/2001 | |
| JP | 2004061713 A | 2/2004 | |
| WO | 8805925 A1 | 8/1988 | |
| WO | 8905989 A1 | 6/1989 | |
| WO | 9507484 A1 | 3/1995 | |
| WO | 9630791 A1 | 10/1996 | |
| WO | 96/38752 | 12/1996 | G02B 6/44 |
| WO | 97/22025 | 6/1997 | G02B 6/36 |
| WO | 9725642 A1 | 7/1997 | |
| WO | 9736197 A1 | 10/1997 | |
| WO | 0221186 A1 | 3/2002 | |
| WO | 02099528 A1 | 12/2002 | |
| WO | 03009527 A2 | 1/2003 | |
| WO | 03093889 A1 | 11/2003 | |
| WO | 2004086112 A1 | 10/2004 | |
| WO | 2005/020400 A1 | 3/2005 | G02B 6/44 |
| WO | 2005050277 A2 | 6/2005 | |
| WO | 2005088373 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007/089682 A2 | 8/2007 | H05K 7/00 |
| WO | 2007129953 A1 | 11/2007 | |
| WO | 2008033997 A1 | 3/2008 | |
| WO | 2008048935 A2 | 4/2008 | |
| WO | 2008137894 A1 | 11/2008 | |

OTHER PUBLICATIONS

Notice of Allowance for U.S. Appl. No. 11/975,440 mailed Jan. 15, 2014, 7 pages.

Non-final Office Action for U.S. Appl. No. 13/094,572 mailed Mar. 4, 2014, 14 pages.

Final Office Action for U.S. Appl. No. 13/479,846 mailed Feb. 14, 2014, 11 pages.

Final Office Action for U.S. Appl. No. 13/613,759 mailed Jan. 27, 2014, 13 pages.

Notice of Allowance for U.S. Appl. No. 11/595,723 mailed Dec. 28, 2010, 8 pages.

Non-final Office Action for U.S. Appl. No. 11/595,723 mailed Jun. 21, 2010, 9 pages.

Non-final Office Action for U.S. Appl. No. 11/595,723 mailed Jan. 5, 2010 9 pages.

Advisory Action for U.S. Appl. No. 11/595,723 mailed Nov. 24, 2009, 3 pages.

Final Office Action for U.S. Appl. No. 11/595,723 mailed Jul. 8, 2009, 13 pages.

Non-final Office Action for U.S. Appl. No. 11/595,723 mailed Sep. 25, 2008, 13 pages.

Final Office Action for U.S. Appl. No. 11/595,723 mailed Apr. 11, 2008, 12 pages.

Non-final Office Action for U.S. Appl. No. 11/595,723 mailed Jun. 7, 2007 18 pages.

Examiner's Answer to Appeal Brief for U.S. Appl. No. 11/975,440 mailed Oct. 22, 2010, 17 pages.

Final Office Action for U.S. Appl. No. 11/975,440 mailed Mar. 8, 2010, 10 pages.

Non-final Office Action for U.S. Appl. No. 11/975,440 mailed Oct. 28, 2009, 7 pages.

Non-final Office Action for U.S. Appl. No. 11/975,440 mailed Jul. 10, 2009, 6 pages.

Notice of Allowance for U.S. Appl. No. 12/566,191 mailed May 24, 2011, 5 pages.

Final Office Action for U.S. Appl. No. 12/566,191 mailed Feb. 15, 2011, 8 pages.

Non-Final Office Action for U.S. Appl. No. 12/566,191 mailed Sep. 30, 2010, 8 pages.

Monro et al., "Holey Fibers with random cladding distributions," Optic Letters, vol. 25, No. 4, Feb. 15, 2000, 3 pages.

Notice of Allowance for U.S. Appl. No. 11/499,572 mailed Jul. 1, 2010, 7 pages.

Advisory Action for U.S. Appl. No. 11/499,572 mailed Jan. 27, 2010, 3 pages.

Final Office Action for U.S. Appl. No. 11/499,572 mailed Aug. 12, 2009, 9 pages.

Advisory Action for U.S. Appl. No. 11/499,572 mailed May 29, 2009, 3 pages.

Final Office Action for U.S. Appl. No. 11/499,572 mailed Dec. 26, 2008, 8 pages.

Non-final Office Action for U.S. Appl. No. 11/499,572 mailed Jun. 13, 2008, 7 pages.

Notice of Allowance for U.S. Appl. No. 12/012,144 mailed Feb. 10, 2009, 6 pages.

Non-final Office Action for U.S. Appl. No. 12/012,144 mailed Jul. 15, 2008, 5 pages.

Notice of Allowance for U.S. Appl. No. 11/712,168 mailed Apr. 21, 2010, 9 pages.

Notice of Allowance for U.S. Appl. No. 11/712,168 mailed Sep. 18, 2009, 9 pages.

Notice of Allowance for U.S. Appl. No. 11/712,168 mailed Jun. 1, 2009, 7 pages.

Notice of Allowance for U.S. Appl. No. 11/712,168 mailed Apr. 7, 2009, 9 pages.

Advisory Action for U.S. Appl. No. 11/712,168 mailed Oct. 20, 2008, 3 pages.

(56) References Cited

OTHER PUBLICATIONS

Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Final Office Action for U.S. Appl. No. 13/083,110 mailed Aug. 5, 2013, 13 pages.
Notice of Allowance for U.S. Appl. No. 12/417,250 mailed Nov. 9, 2011, 8 pages.
Decision on Appeal for U.S. Appl. No. 11/975,440 mailed Nov. 4, 2013, 10 pages.
Advisory Action for U.S. Appl. No. 13/083,110 mailed Nov. 12, 2013, 3 pages.
Non-final Office Action for U.S. Appl. No. 13/094,572 mailed Jan. 18, 2013, 17 pages.
Final Office Action for U.S. Appl. No. 13/094,572 mailed Jul. 8, 2013, 13 pages.
Advisory Action for U.S. Appl. No. 13/094,572 mailed Oct. 7, 2013, 2 pages.
Advisory Action for U.S. Appl. No. 13/275,798 mailed Sep. 12, 2013, 2 pages.
Non-final Office Action for U.S. Appl. No. 13/479,846 mailed Sep. 13, 2013, 11 pages.
Non-final Office Action for U.S. Appl. No. 13/613,759 mailed Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 mailed Dec. 26, 2013, 25 pages.
Non-final Office Action for U.S. Appl. No. 12/417,250 mailed Jun. 23, 2011, 9 pages.
Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.
Advisory Action for U.S. Appl. No. 12/072,187 mailed Aug. 15, 2011, 2 pages.
Final Office Action for U.S. Appl. No. 12/072,187 mailed Jun. 13, 2011, 21 pages.
Non-final Office Action for U.S. Appl. No. 12/072,187 mailed Nov. 30, 2010, 17 pages.
Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
International Search Report for PCT/US2009/057140 mailed Nov. 9, 2009, 2 pages.
Examiner's Answer to Appeal Brief for U.S. Appl. No. 12/323,385 mailed Feb. 21, 2013, 11 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Non-final Office Action for U.S. Appl. No. 12/625,341 mailed Oct. 16, 2012, 8 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Final Office Action for U.S. Appl. No. 12/751,860 mailed Nov. 5, 2012, 6 pages.
Non-final Office Action for U.S. Appl. No. 12/751,860 mailed Jul. 18, 2012, 8 pages.
Final Office Action for U.S. Appl. No. 13/275,798 mailed Jun. 27, 2013, 10 pages.
Non-final Office Action for U.S. Appl. No. 13/275,798 mailed Mar. 1, 2013, 8 pages.
Final Office Action for U.S. Appl. No. 13/177,233 mailed Mar. 29, 2013, 9 pages.
Advisory Action for U.S. Appl. No. 13/177,233 mailed Jul. 17, 2013, 3 pages.
Non-final Office Action for U.S. Appl. No. 13/177,233 mailed Dec. 17, 2012, 7 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Non-final Office Action for U.S. Appl. No. 10/804,958 mailed Aug. 30, 2013, 11 pages.
Notice of Allowance for U.S. Appl. No. 10/804,958 mailed May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.

(56) References Cited

OTHER PUBLICATIONS

Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Non-final Office Action for U.S. Appl. No. 13/083,110 mailed Mar. 18, 2014, 14 pages.
Advisory Action for U.S. Appl. No. 13/613,759 mailed Apr. 7, 2014, 3 pages.
Non-final Office Action for U.S. Appl. No. 13/649,377 mailed Jan. 31, 2014, 5 pages.

\* cited by examiner

DISTRIBUTION DEVICE

RELATED APPLICATIONS

This application claims the benefit of U.S. Provisional Application Ser. No. 61/407,686 filed on Oct. 28, 2010, the entire contents of which are hereby incorporated by reference.

This application also claims the benefit of U.S. Provisional Application Ser. No. 61/325,082 filed on Apr. 16, 2010, the entire contents of which are hereby incorporated by reference.

BACKGROUND

The present invention relates to a distribution device, in particular a wall-mounted distribution board, for handling data conductors or junctions between data conductors in accordance with the precharacterizing clause of claim 1.

When constructing optical waveguide cable networks, for example, optical waveguide distribution devices are required in order to ensure structured wiring. One demand placed on such optical waveguide distribution devices is a maximum possible number of optical waveguide distribution devices fitted with a high packing density and, at the same time, a low level of mechanical stress on the optical waveguides. Similar demands are placed on distribution devices for handling other data conductors.

DE 20 2010 009 385 has disclosed a distribution device in the form of an optical waveguide distribution device having the features of the precharacterizing clause of claim 1. For example, this prior art discloses an optical waveguide distribution device with a housing an with assemblies accommodated in the housing for connecting and/or storing optical waveguides. The housing of the optical waveguide distribution device known from this prior art comprises a housing lower part and a cover-like housing upper part, it being possible for the optical waveguide distribution device to be fixed on a bearing structure, for example on a housing wall, via the housing lower part.

In order to enable access to the data conductors handled in the distribution device, the cover-like housing upper part needs to be capable of being removed from the housing lower part, which is preferably fixed on a housing wall, wherein there is the risk during removal of the housing upper part from the housing lower part of the housing upper part falling and being damaged as it is removed from the housing lower part. This is a disadvantage.

SUMMARY

Against this background, the present invention is based on the problem of providing a novel distribution device. This problem is solved by a distribution device having the features of claim 1. According to the invention, the housing lower part has a holding means for the cover-like housing upper part, with the holding means protruding with respect to an upper side wall of the housing lower part.

The present invention proposes for the first time a distribution device which has a housing lower part having a holding means for the cover-like housing upper part, with the result that the housing upper part can be held by the holding means of the housing lower part as the housing upper part is removed from the housing lower part. This means that there is no longer the risk of the housing upper part falling and being damaged when the housing upper part is removed or released from the housing lower part.

In a closed state of the housing, the holding means of the housing lower part, which protrudes with respect to the upper side wall of the housing lower part, engages in a cutout in an upper side wall of the housing upper part. In a partially open state of the housing, the holding means of the housing lower part likewise engages in the cutout in the upper side wall of the housing upper part, it being possible for the housing upper part to be pivoted upwards with respect to the housing lower part about a pivot axis defined by the holding means of the housing lower part so as to move the housing from the closed state into the partially open state, in the process the housing upper part being held on the housing lower part by means of the holding means.

In a completely open state of the housing, the housing upper part is pivoted upwards with respect to the housing lower part about the pivot access defined by the holding means of the housing lower part and is removed from the holding means of the housing upper part.

BRIEF DESCRIPTION OF THE DRAWINGS

Preferred developments of the invention are given in the dependent claims and the description below. Exemplary embodiments of the invention will be explained in more detail with reference to the drawing, in which:

DETAILED DESCRIPTION

The invention relates to a distribution device, in particular to a wall-mounted distribution board. In the text which follows, the invention will be described for the preferred application of optical waveguide distribution devices.

Figure 1:
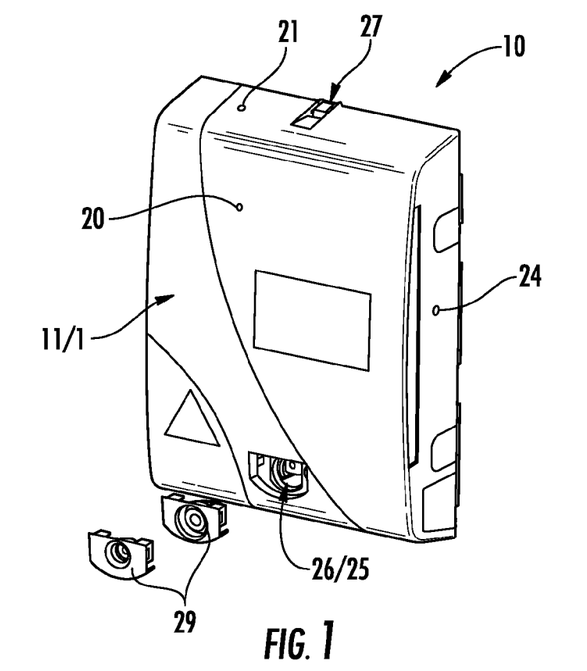
FIG. 1 shows a distribution device according to the invention in the closed state.
Figure 2:
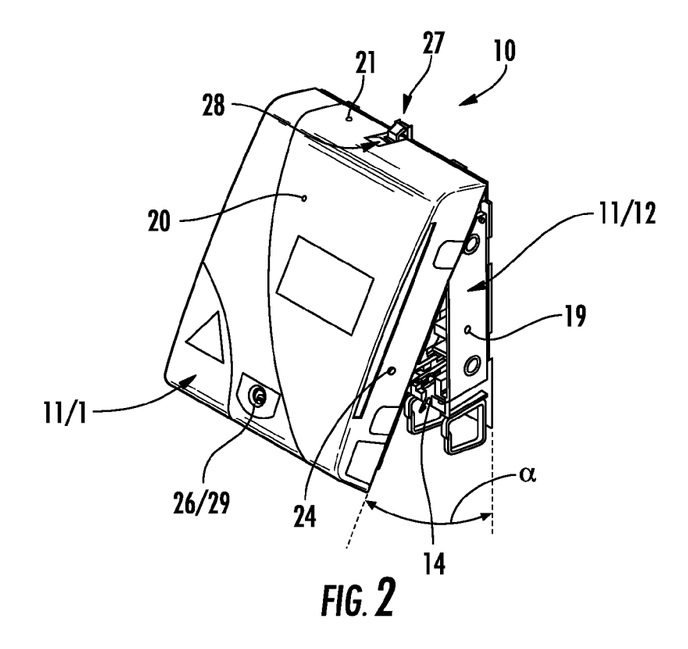
FIG. 2 shows the distribution device shown in FIG. 1 in the partially open state with a cover-like housing upper part held on a housing lower part.
Figure 3:
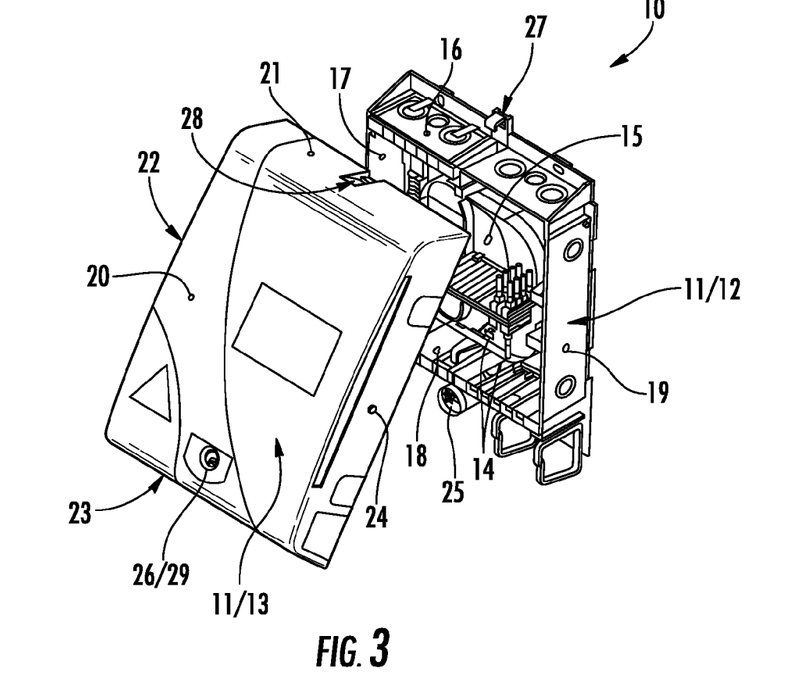
FIG. 3 shows the distribution device shown in FIG. 1 in the completely open state with the housing upper part removed from the housing lower part.

FIGS. 1 to 3 show a preferred exemplary embodiment of an optical waveguide distribution device 10 according to the invention in three different states, namely in a closed state in FIG. 1, in a partially open state in FIG. 2 and in a completely open state in FIG. 3.

The optical waveguide distribution device 10 shown in FIGS. 1 to 3 comprises a housing 11 comprising a housing lower part 12 and a cover-like housing upper part 13. The optical waveguide distribution device according to the invention can be fixed on a bearing structure, for example on a housing wall, via the housing lower part 12. The cover-like housing upper part 13 serves the purpose of closing or releasing an interior of the optical waveguide distribution device 11, in which assemblies 14 for connecting and/or storing optical waveguides are positioned.

The housing lower part 12 of the housing 11 of the optical waveguide distribution device 10 has a rear wall 15 and side walls 16, 17, 18 and 19. The housing lower part 12 of the housing 11 of the optical waveguide distribution device 10 can be screwed to a bearing structure, in particular a housing wall, via the rear wall 15. The housing upper part 13 of the housing 11 of the optical waveguide distribution device 10 comprises a front wall 20 and side walls 21, 22, 23 and 24.

When the optical waveguide distribution device 10 shown in FIG. 1 is closed, the housing upper part 13 is positioned on the housing lower part 12, in which case the side walls 21, 22, 23 and 24 of the housing upper part 13 at least partially cover the side walls 16, 17, 18 and 19 of the housing lower part 12 on the outside. The rear wall 15 of the housing lower part 12 and the front wall 20 of the housing upper part 13 preferably run approximately parallel to one another in this closed state of the optical waveguide distribution device 10.

In the closed state of the housing 11 of the optical waveguide distribution device 10, the housing lower part 12 and the housing upper part 13 can be screwed to one another or locked to one another, in which case a locking element (not shown) extends both through a cutout 25 in the housing lower part 11 and through a cutout 26 in the housing upper part 13.

FIG. 1 shows a replaceable lock 29 as the locking element.

According to the invention, the housing lower part 12 of the housing 11 of the optical waveguide distribution device 10 according to the invention comprises a holding means 27 for the cover-like housing upper part 13, the holding means protruding with respect to the upper side wall 16 of the housing lower part 12.

Figure 5:
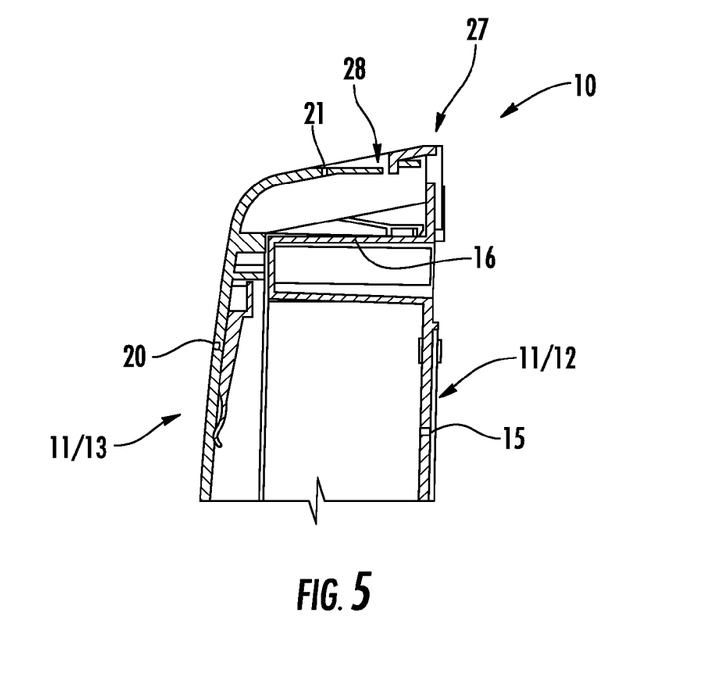
FIG. 5 shows a cross section through the detail shown in FIG. 1 in the closed state of the distribution device.

In the closed state of the housing 11, the holding means 27 of the housing lower part 12 engages in a cutout 28 in the upper side wall 21 of the housing upper part 13.

Figure 6:
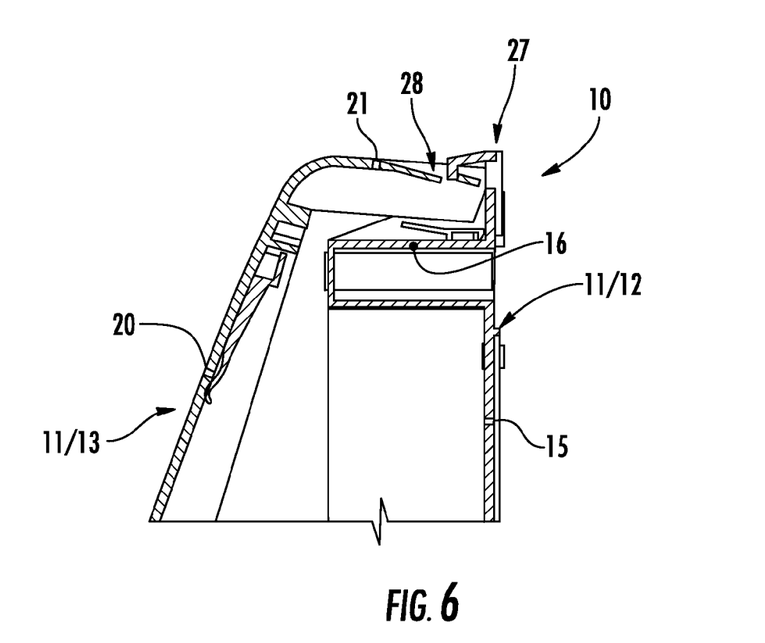
FIG. 6 shows a cross section through the detail shown in FIG. 1 in the partially open state of the distribution device.

In a partially open state of the housing 11, the holding means 27 of the housing lower part 12 likewise engages in the cutout 28 in the housing upper part 13, wherein the housing upper part 13 is pivoted upwards with respect to the housing lower part 12 about a pivot axis defined by the holding means 27 so as to move the housing 11 from the closed state into the partially open state, in which case the holding means 27 holds the housing upper part 13 on the housing lower part 12.

When, in the closed state, the housing lower part 12 and the housing upper part 13 are locked with one another, this locking between said housing lower part and said housing upper part of course needs to be released in order to move the housing 11 into the partially open state, i.e. in order to pivot the housing upper part 13 upwards with respect to the housing lower part 12.

The holding means 27, which engages in the cutout 28 in the housing upper part 13 in the completely closed state of the housing 12 and in the partially open state of the housing 11, holds the housing upper part 13 on the housing lower part 12 up to a defined pivoting angle α of the housing upper part 13 with respect to the housing lower part 12, with this defined pivoting angle α being approximately 30°.

If the housing upper part 13 is accordingly released from the housing lower part 12 and is lifted up partially from said housing lower part by being pivoted, the holding means 27 holds the housing upper part 13 on the housing lower part 12, with the result that there is no risk of the housing upper part 13 falling down in an uncontrolled manner and thus being damaged.

In the completely open state of the housing 11, the housing upper part 13 is pivoted upwards with respect to the housing lower part 12 about the pivot axis defined by the holding means 27 and is removed from the holding means 27 of the housing lower part 11, for which purpose the housing upper part 13 is pivoted upwards with respect to the housing lower part 12 at least about the defined pivoting angle α. If the pivoting angle α of the housing upper part 13 with respect to the housing lower part 11 exceeds the defined pivoting angle of approximately 30°, the holding means 27 automatically comes out of engagement with the cutout 28 of the housing upper part 13, with the result that they can be lifted off from one another without any problems.

In order to position the housing upper part 13 on the housing lower part 12, said housing upper part is threaded, with its cutout 28, into the holding means 27 of the housing lower part 12 at a pivoting angle α which is greater than the defined pivoting angle and then the housing 11 is closed by the housing upper part 13 being pivoted downwards relative to the housing lower part 12, wherein when the housing 11 assumes the closed state shown in FIG. 1, the housing upper part 13 and the housing lower part 12 can be screwed to one another.

Figure 4:
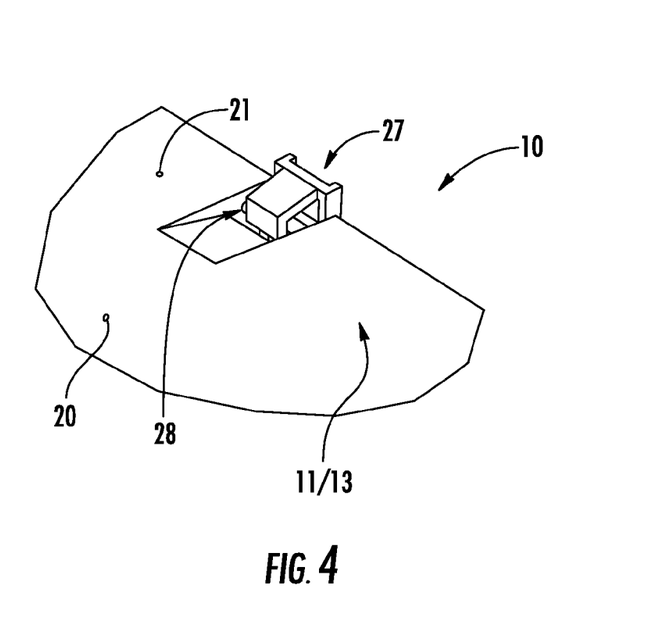
FIG. 4 shows a detail of the distribution device shown in FIG. 1.

Preferably, the holding means 27 of the housing lower part 12, which interacts with the cutout 28 in the housing upper part 13 in the manner described above, is formed on the rear wall 15 of the housing lower part 12 and protrudes with respect to the upper side wall 16 of the housing lower part 12 by a defined amount.

In this case, the holding means 27 has a preferably C-shaped or L-shaped contour in cross section, with the holding means 27 of the housing lower part 11 engaging in the cutout 28 in the housing upper part 13 in the closed state and in the partially open state in such a way that the holding means 27 of the housing lower part 12 engages around or behind a recess of the cutout 28 for the holding means 27. Only when the housing upper part 13 is pivoted upwards relative to the housing lower part 12 through the defined pivoting angle α can the holding means 27 of the housing lower part 12 come out of engagement with the recess of the cutout 28 of the housing upper part 13.

The invention is not restricted to the preferred application of optical waveguide distribution devices. Instead, the invention can also be used for other distribution devices for handling other data conductors than optical waveguides, for example for handling copper conductors.

We claim:

1. A distribution device for handling data conductors or junctions between data conductors, comprising:
   a housing comprising a housing lower part and a removable cover-like housing upper part pivotably attached to the housing lower part;
   assemblies in the housing for connecting and/or storing data conductors; and
   a holder on the cover-like housing upper part, wherein the holder protrudes with respect to an upper side wall of the housing lower part, and wherein the holder allows the cover-like housing upper part to pivot upwards between a closed state and an open state of the housing;
   wherein the holder allows the housing upper part to be pivoted upwards with respect to the housing lower part about a pivot axis defined by the holder so as to move the housing from the closed state into a partially open state having a defined pivoting angle, such that the holder maintains the housing upper part at the defined pivoting angle with respect to the housing lower part when the housing upper part is pivoted upwards and at the partially open state.

2. The distribution device of claim 1, wherein in the closed state of the housing, a first portion of the holder engages in a cutout in the upper side wall of the housing upper part to maintain the housing in the closed state.

3. The distribution device of claim 2, wherein in the partially open state of the housing, a second portion of the holder engages the cutout to maintain the housing upper part at the defined pivoting angle with respect to the housing lower part when the housing upper part is pivoted upwards and at the partially open state.

4. The distribution device of claim 1, wherein the defined pivoting angle is approximately 30°.

5. The distribution device of claim 1, wherein in a completely open state the housing upper part is pivoted upwards with respect to the housing lower part about the pivot axis defined by the holder of the housing lower part such that the housing upper part is removable from the holder.

6. The distribution device of claim 5, wherein in the completely open state of the housing, the housing upper part is pivoted upwards with respect to the housing lower part at least about the defined pivoting angle.

7. The distribution device of claim 1, wherein the holder of the housing lower part acts on a rear wall of the housing lower part when the housing is in the closed state and in the partially opened state.

8. The distribution device of claim 1, wherein the holder has one of a C-shaped and L-shaped contour in cross section.

9. The distribution device of claim 8, wherein the holder engages a cutout in the upper side wall of the housing upper part, when the housing is in a closed state and a partially open state, and wherein the cutout forms a recess for the holder.

* * * * *